Feb. 6, 1923.
H. B. LAYMAN
CONNECTING ROD
Original Filed Mar. 24, 1916    2 sheets-sheet 1
1,444,472
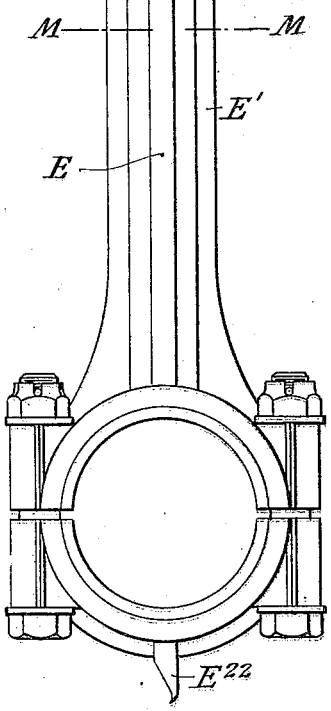
Fig. 1
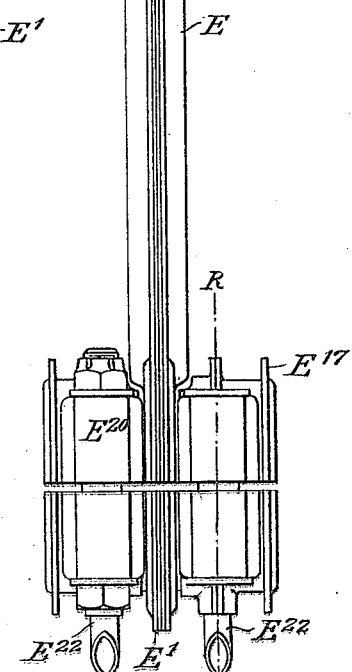
Fig. 3
Fig. 2
Inventor
Hebron B. Layman
By his Attorneys
Kerr Page Cooper & Hayward

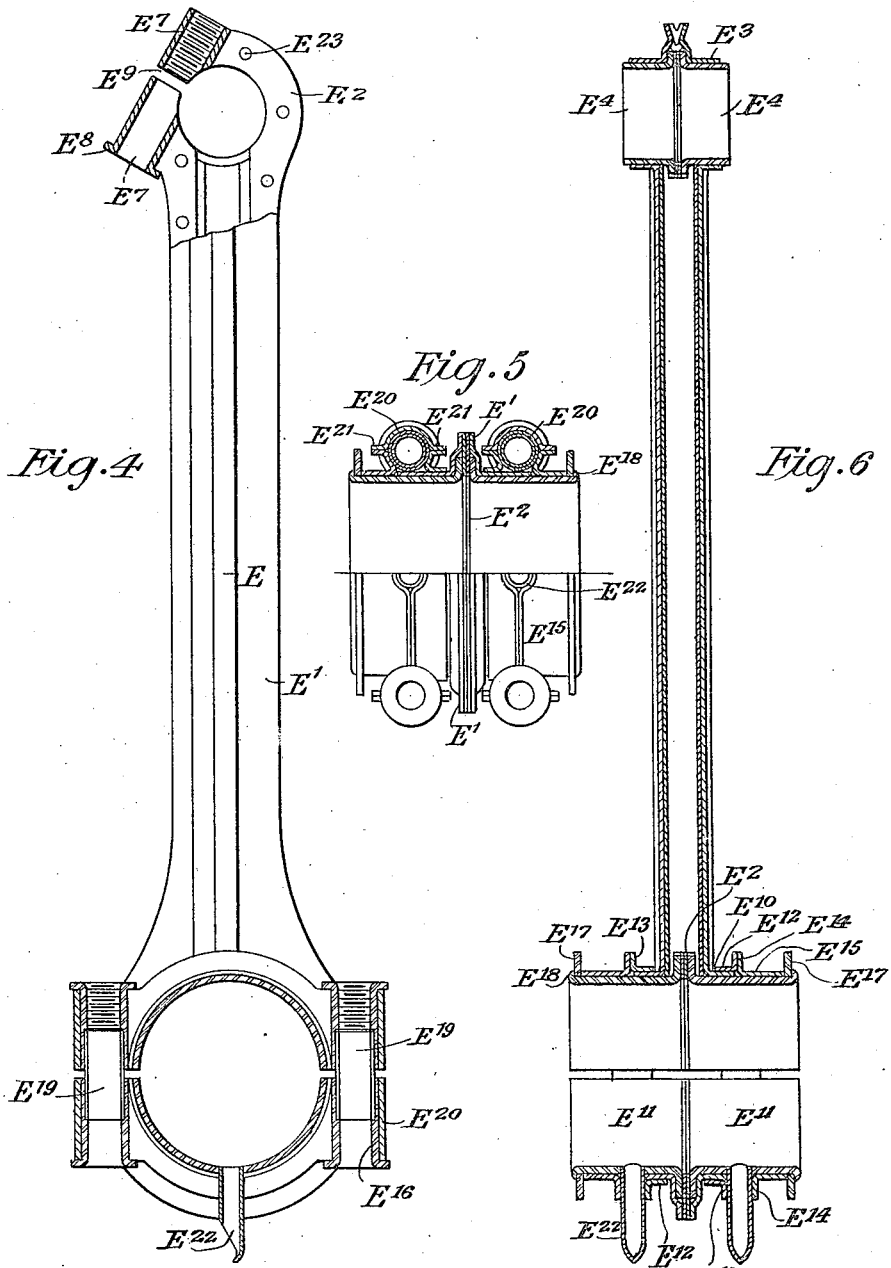

Patented Feb. 6, 1923.

1,444,472

UNITED STATES PATENT OFFICE.

HEBRON B. LAYMAN, OF NEW YORK, N. Y., ASSIGNOR TO THE LAYMAN PRESSED ROD COMPANY, INC., OF NEW YORK, N. Y., A CORPORATION OF NEW YORK.

CONNECTING ROD.

Original application filed March 24, 1916, Serial No. 86,361. Divided and this application filed August 9, 1921. Serial No. 490,854.

*To all whom it may concern:*

Be it known that I, HEBRON B. LAYMAN, a citizen of the United States of America, residing at New York, in the county and State of New York, have invented certain new and useful Improvements in Connecting Rods, of which the following is a full, clear, and exact description.

This invention relates to sheet metal connecting rods, and more particularly to rods built up from a plurality of sheet metal parts.

The present application is a division of my co-pending application Serial No. 86,361, filed March 24, 1916.

One of the objects of the present invention is to provide an improved means for holding the piston pin in place. Another object is the provision of means whereby the cap may be secured to the rod at four or more points.

Other important objects of this invention are the provision of means for reinforcing the shank portion of the rod against shear as well as compression and more particularly increasing the ability of the rod to withstand tension in the region of the junction of the bosses and shank.

Other objects will appear in the accompanying specification and in the appended claims.

In the drawings:—

Fig. 1 is a side elevation of a rod showing an embodiment of the invention in which 4 attaching bolts are provided.

Fig. 2 is a cross section taken on line M—M of Fig. 1.

Fig. 3 is an edge view of the rod shown in Fig. 1.

Fig. 4 is a side elevation of the rod with the piston end broken away and partly in section and the crank end shown in section taken on line R—R of Fig. 3.

Fig. 5 is a bottom view of the rod shown in Figs 1, 3 and 4. Half of the view shows the bottom of the cap and the other half the abutting face of the rod at the junction with the cap.

Fig. 6 is a sectional view taken on line M—M of Fig. 1.

The rod herein illustrated comprises two similar sheet metal body sections E having flanges E′ which abut in a place at right angles to the crank axis.

The two flanges form a reinforcing rib which extends along the shank and around the crank shaft and piston pin bosses. One of the principal functions of the flange is to provide an adequate means for securing the two parts together and also to form a reinforcement around the crank shaft boss such as will prevent the boss from spreading out of round. The general arrangement of this flange is best shown in Fig. 5.

Within the body sections, and preferably of similar conformation, are two reinforcing members $E^2$. These are formed from sheet metal and are secured to each body section by electric welding as indicated by the circles marked $E^{23}$ in Fig. 4. The reinforcing members not only serve as a shank reinforce but extending as they do about the piston and crank ends, serve as a supplementary means for carrying the load from the piston to the crank ends of the rod.

The body sections of the rod are provided with bosses $E^3$ at one end and these bosses together form a piston pin boss in the completed rod. The pin boss is also provided with interior reinforcing sleeve-like members $E^4$ having flanges $E^5$ which, at the center of the rod, abut against and are secured to the reinforcements $E^2$. By and between the parts which form the piston end of the rod there is provided a bolt boss $E^6$ disposed at an angle thereto and intercepting the pin as shown in Fig. 4. The bolt boss is provided with an interior reinforcement $E^7$ which has a flange $E^8$ at one end to form a seat for a cap screw or stud. The reinforcing ferrule is preferably threaded for half its length to receive the cap screw.

The pinch bolt boss is cut in two midway of its length as shown at $E^9$ to allow the piston pin boss to be pinched around the piston pin (not here shown).

As shown in Fig. 6, the body sections are provided with integral crank pin bosses $E^{10}$ and secured within these bosses are reinforcing members $E^{11}$. These members are drawn flanged ferrules which abut against the reinforcing members $E^2$ at the center of the rod. Fitted on and encircling the boss $E^{10}$ is a member $E^{12}$ which has an abutting flange $E^{13}$ which adjoins the flange $E^{14}$ of another and substantially similar member $E^{14}$. By and between the abutting flanges $E^{13}$ and $E^{14}$ are formed recesses into which are fitted ferrules $E^{16}$ (see Fig. 4). By this means the cap is secured in place. It will be noticed that the member $E^{15}$ does not rest upon the integral boss $E^{10}$ of the body sections, but upon the reinforcing liner bushing $E^{11}$. In actual practice little is gained in strength by extending the boss $E^{10}$ for the full width of the crank pin boss (i. e. the overall width of the two bushings $E^{11}$) and to draw the metal to such depth requires additional operations, which, in practice, may be dispensed with. When the crank end is thus constructed there will be a tendency for the boss to spread when the rod is in service, and to prevent such action I provide radial flanges composed of two elements $E^{12}$ and $E^{12}$. Additional flanges may be provided by using rings $E^{17}$ at the ends of the crank pin boss. These flanges are loose rings and are the last elements to be assembled upon the boss. After these rings are placed the ends of the bushings $E^{11}$ are spread over as shown at $E^{18}$ to clinch the rings in place and also aid in securing the body sections together.

In Figs. 4 and 5 the ferrules $E^{16}$, which are shown in the bolt bosses formed by and between the abutting parts on the crank boss, are provided with a lining sleeve $E^{19}$ and a threaded end portion. The bolt bosses are also provided with cap members $E^{20}$ having flanges $E^{21}$ which abut with the flanges $E^{13}$ and $E^{14}$. This cap forms a closure for the bolt boss and gives the rod a symmetrical and pleasing finish, besides very materially strengthening the bolt boss against the tension of the bolt.

In order to lubricate the crank end bearing I provide oil tubes $E^{22}$. These tubes are secured in bosses formed by and between the flanges $E^{13}$ and $E^{14}$. The tubes may be secured in position by welding or brazing. The tubes are adapted to deposit the oil in the crank core and act as oil scoops.

The provision of the central reinforcing member $E^{2}$ and the arrangement of the collar-like reinforcing member at the crank ends of the rod are particularly adapted for 4 bolt caps on which the securing bosses are disposed as to the side of a plane passing through the center of the rod (see Fig. 5).

What I claim is:—

1. A sheet metal connecting rod comprising abutting sheet metal parts, and having a piston pin end and a crank pin end, a pinch bolt boss at the piston pin end formed by and between the abutting parts at the piston pin end of the rod, and a crank pin bearing in the crank end of the rod in which the crank pin is rotatable.

2. A sheet metal connecting rod, comprising abutting sheet metal parts and having a piston end and a crank end, said crank end having a plurality of pairs of bolt bosses disposed at each side of the axis of the rod, said bosses comprising exteriorly applied elements affixed to the crank end portions of the rod and shaped to receive fastening means for a cap.

3. A connecting rod having a bolt boss formed by and between parts composing one end of the rod, said boss being sawn in two to allow it to be pinched by a bolt.

4. A sheet metal connecting rod provided with a shank portion and an integral end portion forming a crank shaft boss, a flange integral with the said shank portion and extending around said boss approximately centrally axially and means each side of said flange for securing a cap to the rod.

5. A connecting rod having an integral shank and end portion provided with a cap, the said rod and cap together forming a crank shaft boss, the said rod having a radial flange approximately central of the boss axially and means disposed at each side thereof encompassing the rod portion of said boss for securing the cap to the rod.

6. A connecting rod having a boss in one end portion, and a pinch bolt boss at an angle thereto formed by a plurality of parts, said pinch bolt boss being sawn in two to allow it to be pinched by a bolt.

7. A connecting rod comprising a plurality of sheet metal parts having piston and crank end portions and reinforcing means secured between said parts and against which the parts abut, said reinforcing means having portions thereof extending around the piston and crank pins to reinforce the end portions of the rod.

8. A connecting rod comprising a plurality of sheet metal parts, each said part having bosses at their ends, reinforcing members between the said parts against which the said parts abut, sleeve-like members within the larger end bosses abutting said reinforcing members, and collar-like flanges cooperating with said sleeve members and the larger end boss to reinforce the end of the rod.

In testimony whereof I hereto affix my signature.

HEBRON B. LAYMAN.